United States Patent Office 3,218,271
Patented Nov. 16, 1965

3,218,271
FOAMABLE NOVOLAC COMPOSITION AND CEL-
LULAR PHENOLIC BODY PRODUCED BY CURE
Robert Wong, 640 Euclid Ave., and Philip W. Sullivan,
  393 Mount Vernon Road, both of Newark, Ohio
No Drawing. Original application Apr. 6, 1960, Ser. No.
  20,244. Divided and this application July 17, 1962,
  Ser. No. 215,231
              4 Claims. (Cl. 260—2.5)

This is a division of co-pending application Serial No. 20,244 filed April 6, 1960, and now abandoned.

This invention relates to a foamable novolac composition, and, more particularly, to a foamable novolac composition containing a silicate that can be produced by reaction involving silicon tetrachloride, an alcohol and a glycol.

The principal object of the invention is the provision of a new and improved foamable novolac composition which produces a phenolic body having a uniform fine cellular structure, and which foamable composition will produce this fine cellular structure without unduly exacting control of process variables.

In the production of various foamed or cellular compositions, it has been found that the addition of certain surface active agents or surfactants is advantageous. It has also been found that certain silicones of the type suggested by U.S. Patent 2,386,793 (see also Eugene G. Rochow, Chemistry of the Silicones, 2nd edition, John Wiley & Sons, Inc., New York, N.Y., page 57) can be substituted for the most effective usual surfactants with superior results. The present invention is based upon the discovery that silicates [1] of a new class are even more effective than silicones of the indicated type for use in place of conventional surfactants in a foamable composition.

According to the invention, a class of new silicates is provided. A silicate of such class can be represented by the generic formula $$[RO-]_m[Si-O-R'-O-]_n$$

where R represents an alkyl radical, preferably having from 1 to 6 carbon atoms, R' represents an alkylene radical, preferably having from 2 to 6 carbon atoms, $n$ is an integer, preferably from 1 through 10, and $m$ is an integer, and is at least 2, but is not greater than $3n$, and any free valence is attached to the silicon of a group having the formula

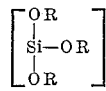

where R has the meaning set forth above.

A preferred class of silicates according to the invention can be represented by the structural formula

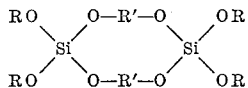

where R and R' have the meanings set forth above.

Still another preferred class of silicates according to the invention can be represented by the generic formula

---

[1] The term "silicate" is used herein, and in the appended claims, in its usual sense, to refer to materials characterized by the presence of Si—O—C bonds, as in methyl, ethyl and the like orthosilicates, while the terms "silane" and "silicone" are also used in their ordinary sense to refer to materials characterized by the presence of Si—C bonds. In addition to Si—C bonds, silanes may have Si—O—C bonds, Si—H bonds, Si—X bonds, or a combination, where X represents halogen, and silicones may have Si—O—Si bonds.

where R and R' have the meanings set forth above.

Other silicates according to the invention are straight chain compounds, and can be represented by the generic formula

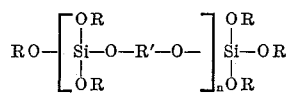

where R, R' and $n$ have the meanings set forth above.

A silicate according to the invention can be produced according to the procedure set forth in Example 1, below, wherein, as elsewhere in the instant specification and in the appended claims, the terms "percent" and "parts" refer to percent and parts by weight, unless otherwise indicated. It is to be understood that Example 1, and the subsequent examples, are presented only for the purpose of further illustrating and disclosing the invention, and are in no way to be construed as limitations thereon.

EXAMPLE 1

A glass reaction vessel was charged with 100 grams of benzene at room temperature of about 25° C. The benzene in the reaction vessel was stirred while a 170 gram portion of silicon tetrachloride was added, dropwise, to the benzene, and, simultaneously, a mixture of 64 grams of methyl alcohol and 76 grams of propylene glycol was added, dropwise, to the benzene. The addition of silicon tetrachloride, methyl alcohol and propylene glycol required approximately 2 hours. Stirring of the benzene and reaction mixture was continued, after completion of addition of the silicon tetrachloride, methyl alcohol and propylene glycol, until gas evolution ceased, or for approximately an additional two hours. The resulting reaction mixture was then vacuum distilled at a pressure of approximately 1 inch of mercury and a temperature of approximately 70° C. for 80 minutes to remove the benzene and any hydrogen chloride which remained therein. A sample of the resulting product was subjected to infrared absorption analysis, and, from the absorption pattern, the predominate structure was determined to be

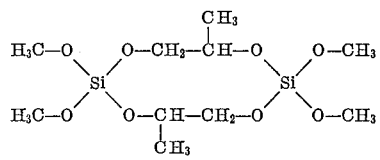

The infra-red absorption pattern also indicated the presence of some acyclic materials of a similar nature, all of which can be represented by the general formula

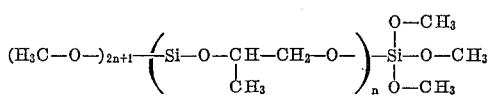

The procedure described above has also been carried out using various solvents other than benzene, and various combinations of reactants other than those specifically set forth. The reactants used, the quantity of each, and the principal reaction product, as determined by examination of its infra-red absorption pattern are presented in Table I, below, for representative ones of such reactions where 100 gram portions of benzene or toluene were used as the solvent charge:

Table 1

| Reaction Mixture Composition: | Reaction Mixture Designation | | | | | | |
|---|---|---|---|---|---|---|---|
| | A* | B | C | D | E | F | G |
| Silicon tetrachloride | 170 | 170 | 170 | 170 | 170 | 170 | 170 |
| Isopropanol | 120 | | 120 | | 120 | 120 | 120 |
| 4,5-octanediol | | | | | | | 146 |
| 2-ethyl hexanediol-1,3 | | | | | | 146 | |
| 2-methyl-2,4-pentanediol | | | | | 118 | | |
| 1,2-butylenediol | | | | 90 | | | |
| Ethylenediol | | | 62 | | | | |
| Methanol | | 64 | | 64 | | | |
| 1,2-propanediol | 76 | 76 | | | | | |
| Solvent: | | | | | | | |
| Benzene | 100 | | 100 | 100 | 100 | 100 | 100 |
| Toluene | | 100 | | | | | |

*This procedure constitutes the best presently known mode for producing a silicate according to the invention. The product is hereinafter, for convenience, referred to as "Silicate A."

| Reaction Mixture Designation | Principal Reaction Product |
|---|---|
| A | [H $\overset{\text{CH}_3}{\underset{\text{CH}_3}{\text{C}}}$—O—]$_{2n}$[Si—O—$\overset{\text{CH}_3}{\text{CH}}$—CH$_2$—O—]$_n$ |
| B | [H$_3$C—O—]$_{2n}$[Si—O—$\overset{\text{CH}_3}{\text{CH}}$—CH$_2$—O—]$_n$ |
| C | [H $\overset{\text{CH}_3}{\underset{\text{CH}_3}{\text{C}}}$—O—]$_{2n}$[Si—O—CH$_2$—CH$_2$—O—]$_n$ |
| D | [H$_3$C—O—]$_{2n}$[Si—O—$\overset{\text{CH}_2\text{CH}_3}{\text{CH}}$—CH$_2$—O—]$_n$ |
| E | [H $\overset{\text{CH}_3}{\underset{\text{CH}_3}{\text{C}}}$—O—]$_{2n}$[Si—O—$\overset{\text{CH}_3}{\underset{\text{CH}_3}{\text{C}}}$—CH$_2$—$\overset{\text{CH}_3}{\text{CH}}$—O—]$_n$ |
| F | [H $\overset{\text{CH}_3}{\underset{\text{CH}_3}{\text{C}}}$—O—]$_{2n}$[Si—O—CH$_2$—$\overset{\text{CH}_2\text{CH}_3}{\text{CH}}$—$\overset{\text{CH}_2\text{CH}_2\text{CH}_3}{\text{CH}}$—O—]$_n$ |
| G | [H $\overset{\text{CH}_3}{\underset{\text{CH}_3}{\text{C}}}$—O—]$_{2n}$[Si—O—CH$_2$—$\overset{\text{CH}_2\text{CH}_2\text{CH}_2\text{CH}_2\text{CH}_2\text{CH}_3}{\text{CH}}$—O—]$_n$ |

EXAMPLE 2

The procedure described in Example 1, above, has also been modified in various ways, and it has been ascertained that the specific order in which the reactants are charged to a reaction vessel is immaterial. For example, each of the following procedures has been carried out with essentially the same kind of result achieved by the procedures of Example 1.

A glass reaction vessel was charged with 100 grams of benzene and 64 grams of methyl alcohol, and a 170 gram portion of silicon tetrachloride was added dropwise, with stirring, to the charge in the reaction vessel. The addition of the silicon tetrachloride required approximately 2 hours. After addition of the silicon tetrachloride, a 76 gram portion of propylene glycol was added dropwise to the reaction mixture, with stirring, the addition requiring approximately 2 hours. Stirring was continued for approximately 1 hour after completion of the addition of propylene glycol, and the benzene and any remaining hydrogen chloride were removed from the reaction mixture by vacuum distillation as described in Example 1. It was determined by examination of its infra-red absorption pattern that the principal constituent of the resulting reaction product had the following structural formula:

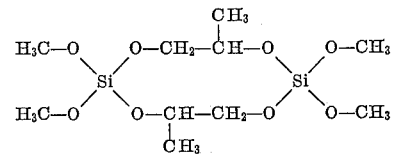

A glass reaction vessel was charged with 100 grams of benzene, 76 grams of propylene glycol and 64 grams of methyl alcohol. A 170 gram portion of silicon tetrachloride was added dropwise, with stirring, to the charge in the reaction vessel over a period of approximately 2 hours, and stirring was continued for approximately 2 hours after completion of the addition of the silicon tetrachloride. The reaction products were then subjected to vacuum distillation as described in Example 1. Examination of the infra-red absorption pattern of the resulting product indicated that the principal constituent thereof was the silicate represented by the structural formula in the preceding paragraph.

It will be apparent from the foregoing specific procedures described by way of example that no particular precaution is necessary in producing a silicate according to the invention, and that any lower aliphatic alcohol, any lower glycol, and any silicon tetrahalide can be employed as starting materials. Preferred lower aliphatic alcohols are represented by the formula R—OH where R is an alkyl radical having from 1 to 6 carbon atoms. Preferred glycols are represented by the formula $$HO—R'—OH$$

where R' is a straight or branched alkylene radical having from 2 to 6 carbon atoms. Silicon tetrachloride is a particularly advantageous starting material for economic reasons, although silicon tetrabromide can also be employed. Silicon tetrafluoride is less desirable, because its gaseous nature requires special precautions in use, but could be employed if desired for a particular reason. In addition, silicon tetraiodide could be used, but an elevated temperature or a solvent for the silicon tetraiodide would be necessary.

The following examples describe the production of various foamed or cellular products from compositions including a silicate according to the invention. Such constitutes the best presently known use for silicates according to the invention.

EXAMPLE 3

A quantity of a dehydrated novolac, hereinafter for convenience referred to as "Novolac A", and subsequently described in more detail, was melted by heating to a temperature of substantially 140° C. A 76 part portion of the fused Novolac A was then transferred to a 10 gallon mixing vessel and allowed to cool, under agitation, to about 110° C. When the fused novolac was of uniform consistency throughout and at a temperature of approximately 110° C., 2 parts of the previously identified "Silicate A," 2 parts of minus 200 mesh ammonium acetate, and 2 parts of minus 200 mesh diisobutylene were quickly added to the fused novolac and were mixed thoroughly by means of a motor driven, propeller-type agitator. Eighteen parts of a minus 200 mesh mixture of hexamethylenetetramine and dinitrosopentamethylenetetramine (the mixture consisting of 16 parts of hexamethylenetetramine and 2 parts of dinitrosopentamethylenetetramine) were then quickly added to the mixture of the novolac, Silicate A, ammonium acetate, and diisobutylene, and thoroughly agitated, care being taken that the resulting mix was of uniform consistency before it cooled below a temperature at which the viscosity of the same was such that thorough and complete mixing could not be accomplished. The resulting mixture, consisting of 76 parts of Novolac A, 16 parts of hexamethylenetetramine, 2 parts of Silicate A, 2 parts of dinitrosopentamethylene-tetramine, 2 parts of diisobutylene, and 2 parts of ammonium acetate was a foamable, curable novolac-containing composition.

A portion of the fused novolac-containing composition was then knife coated onto one surface of a phenol-formaldehyde bonded glass fiber board to a thickness of about 30 grams per square foot, a second such board was then superimposed upon the first, with its under side in contact with the coated surface of the first. This procedure was repeated until a lamellar structure composed of 24 of the boards and 23 layers of the novolac composition was produced. Each of the phenol-formaldehyde bonded glass fiber boards had an apparent density of 10½ pounds per square foot, and was 2′ x 4′ x 1″ in size. The resulting structure was then cut into 24 slices, each approximately 1″ thick. Each cut was parallel to one of the edges of the structure, and was through each of the 23 layers of the novolac composition. Each slice was then compressed to about 92 to 95 percent of its original width (the compressive force being applied so that it tended to compress each of the 23 layers of the novolac composition between two of the boards) to assure intimate contact between adjacent sections of the glass wool board and the interposed layers of the novolac composition.

Another portion of the fused novolac-containing composition was also knife-coated onto one surface of kraft paper supporting skins to a thickness of about 30 grams per square foot. One skin was placed onto the upper surface of each of the slices produced as described above, and another was placed on the under surface thereof, so that the coated sides of the kraft paper supporting skins were adjacent said upper and under surfaces, respectively, of the slice.

The resulting assembly was then placed between a pair of spaced platens and heated dielectrically to a temperature of about 360° F. for approximately two minutes, sufficient pressure being supplied from the spaced platens and a pair of spaced side support members to prevent any separation occurring between the parts of the assembly, and to compress fibers, as discussed above. A completed I-beam structure was then removed from between the platens. The expanded, cured novolac foam was found to have penetrated into the glass wool board sections approximately ¼″, and to have formed a rigid, high strength structure having an apparent density of 16.1 lbs. per cubic foot, a high K value and good flexural and compressive strengths.

The procedures described above have also been repeated using, as the foamable composition, the following solution or dispersion:

| | Parts |
|---|---|
| Novolac A | 77 |
| Ethyl alcohol | 33 |
| Silicate A | 4 |
| Dinitrosopentamethylenetetramine | 4 |
| Hexamethylenetetramine | 8 |

Novolac A was produced in a jacketed, 10 gallon glass-lined kettle fitted with an anchor-type agitator, a thermometer and a reflux condenser from a charge of 20.29 kilograms of U.S.P. phenol, 12.95 kilograms of 37 percent formalin (a 37 percent solution of formaldehyde in water) and 0.1 kilogram of oxalic acid. The phenol and the formaldehyde were mixed at about 40° C. in the reaction kettle, and the oxalic acid, in a granular condition, was added. The agitator was driven to accomplish this mixing, and was continued until reaction between the phenol and the formaldehyde was substantially complete, and a novolac had been formed. Water at a temperature of about 50° F. was also circulated through the jacket of the reflux condenser from the beginning of the mixing operation until substantial completion of the reaction between the phenol and formaldehyde and production of the novolac. The kettle was then heated by circulating low pressure steam through the jacket to bring the reaction mixture to a temperature ranging from 94° C. to 96° C., and water or steam was then used, as required, to maintain the reaction mixture at a temperature within such range for a period of 6½ hours. Agitation of the reaction products in the kettle was then stopped, and the reaction products were allowed to stand for about 1 hour. During this time a phase separation occurred, an aqueous layer rising to the top, and an organic layer collecting in the bottom of the kettle. The aqueous top layer was then siphoned from the kettle; agitation was resumed; and steam was introduced into the jacket of the kettle to bring the reaction products to a temperature of approximately 120° C. in a period of about 2½ hours. The reaction products were maintained at about 120° C. by suitable adjustment of the flow of steam to the kettle jacket, while gases and vapors were exhausted from the upper portion of the kettle to decrease the pressure therein gradually, over a period of about 15 minutes, until a vacuum of 28″ of mercury was reached, and for an additional hour while a vacuum of about 28″ of mercury was maintained.

Silicate A has also been used in commercially available, foamable diisocyanate polyester- and polyether-compositions, and has been found to be superior to a chemically similar silicone wherein methyl radicals are substituted for the alkoxy groups of Silicate A. In such use, the principal advantage of Silicate A is that it enables the production of foamed structures having a finer cell structure. For example, a commercial method for producing a rigid polyurethane foam involves preparing a first mix, at 140° F., from 95 parts of a first polyester, ½ part of a silicone which is similar to Silicate A except that alkyl groups are substituted for the isopropoxy groups, and 0.2 part of dimethyl ethanolamine, preparing a second mix from 100 parts of a second polyester and 35 parts of trichlorotrifluoromethane, blending the first and second mixes together, and casting the resulting blend into a mold. When this commercial method was repeated, except that Silicate A was used instead of the indicated silicone, significant improvement of the rigid foam produced was indicated by a considerably smaller cell size.

It will be apparent that various changes and modifications are possible from the specific details set forth herein without departing from the spirit and scope of the attached claims.

What we claim is:

1. A foamable composition comprising about 80 parts of a novolac, a quantity of a curing agent which is reactive with the novolac, by connecting molecules thereof through methylene groups, and sufficient in amount to convert, at an elevated temperature, the novolac to a thermoset condition, a blowing agent in an amount effective to produce a foam, and from about 0.2 part to about 10 parts of a silicate having the generic formula

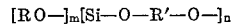

wherein R is an alkyl radical, R′ is an alkylene radical, $n$ is an integer, and $m$ is an integer, and is at least 2, but is not greater than $3n$, and any free valence is attached to the silicon of a group having the formula

wherein R has the meaning set forth above.

2. A foamable composition comprising about 80 parts of a novolac, a quantity of a curing agent which is reactive with the novolac, by connecting molecules thereof through methylene groups, and sufficient in amount to convert, at an elevated temperature, the novolac to a thermoset condition, a blowing agent in an amount effective to produce a foam, and from about 0.2 part to about 10 parts of a silicate having the generic formula

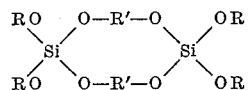

wherein R is an alkyl radical having from 1 to 6 carbon atoms, and R' is an alkylene radical having from 2 to 6 carbon atoms.

3. A foamable composition comprising about 80 parts of a novolac, a quantity of a curing agent which is reactive with the novolac, by connecting molecules thereof through methylene groups, and sufficient in amount to convert, at an elevated temperature, the novolac to a thermoset condition, a blowing agent in an amount effective to produce a foam, and from about 0.2 part to about 10 parts of a silicate having the generic formula

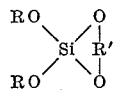

wherein R is an alkyl radical having from 1 to 6 carbon atoms, and R' is an alkylene radical having from 2 to 6 carbon atoms.

4. A cellular phenolic body produced by cure of a foamable composition comprising about 80 parts of a novolac, a quantity of a curing agent which is reactive with the novolac, by connecting molecules thereof through methylene groups, and sufficient in amount to convert, at an elevated temperature, the novolac to a thermoset condition, a blowing agent in an amount effective to produce a foam, and from about 0.2 part to about 10 parts of a silicate having the generic formula

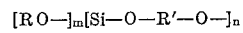

wherein R is an alkyl radical, R' is an alkylene radical, $n$ is an integer, and $m$ is an integer, and is at least 2, but is not greater than $3n$, and any free valence is attached to the silicon of a group having the formula

wherein R has the meaning set forth above.

References Cited by the Examiner
UNITED STATES PATENTS

| | | | |
|---|---|---|---|
| 2,993,871 | 7/1961 | Shannon et al. | 260—2.5 |
| 3,081,269 | 3/1963 | Shannon et al. | 260—2.5 |
| 3,085,104 | 4/1963 | Smith et al. | 260—448.8 |

FOREIGN PATENTS

| | | |
|---|---|---|
| 712,845 | 8/1954 | Great Britain. |

OTHER REFERENCES

Krieble et al.: "Journal American Chem. Soc.", Vol. 69 (1947), (pages 2689–92).

Staudinger et al.: "Makromolekulore Chemie," Vol. 11, No. 1 (October 1953), pages 24–50.

MURRAY TILLMAN, *Primary Examiner.*

LEON J. BERCOVITZ, *Examiner.*